United States Patent [19]
Kocian

[11] 3,735,542
[45] May 29, 1973

[54] FISHHOOK SHARPENER
[75] Inventor: Steve J. Kocian, Berwyn, Ill.
[73] Assignee: Paul M. Komarec, Westchester Village, Ill.; a part interest
[22] Filed: July 16, 1971
[21] Appl. No.: 163,327

[52] U.S. Cl..................................51/181 R, 51/204
[51] Int. Cl. ...............................................B24d 15/02
[58] Field of Search ................51/204, 205 R, 211 R, 51/181 R

[56] References Cited
UNITED STATES PATENTS

| | | | |
|---|---|---|---|
| 3,468,068 | 9/1969 | Spruell | 51/205 R X |
| 762,754 | 6/1904 | Perkins | 51/204 UX |
| 2,698,503 | 1/1955 | Haworth | 51/204 X |
| 2,724,221 | 11/1955 | Shaw | 51/204 |
| 3,436,870 | 4/1969 | Sellman | 51/204 |
| 2,723,508 | 11/1955 | Haworth | 51/204 |
| 1,218,741 | 3/1917 | Boughton | 51/181 |

Primary Examiner—Donald G. Kelly
Attorney—Stone, Zummer & Aubel

[57] ABSTRACT

A fish hook sharpener which includes a tube and a rod for holding a fish hook. A cap is removably mounted on the tube to hold the rod within the tube. The cap carries a formed abrasive means for sharpening the point of the fish hook. The rod is magnetized for retaining the fish hook after the rod is withdrawn from the tube.

5 Claims, 6 Drawing Figures

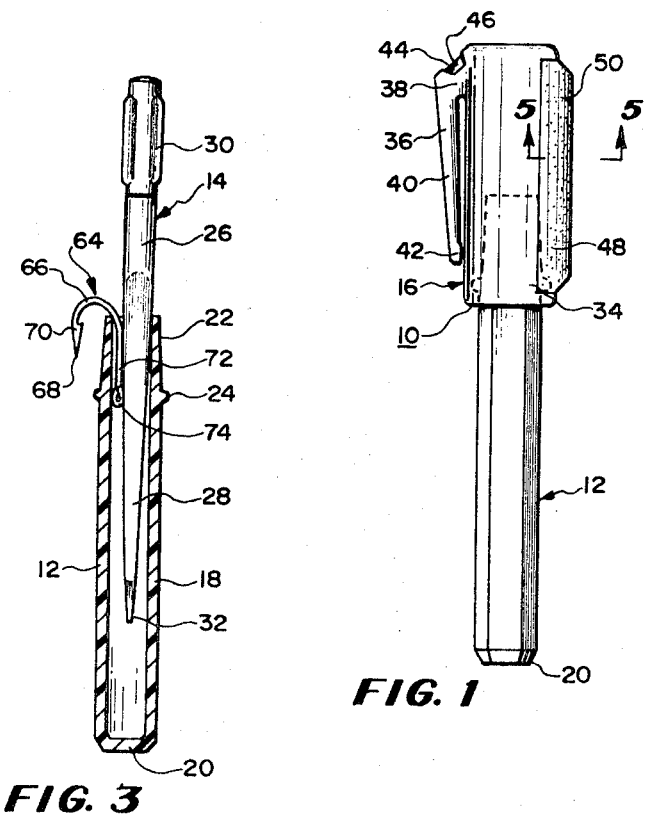

3,735,542

FISHHOOK SHARPENER

BACKGROUND OF THE INVENTION

It is generally recognized by fishermen that it is essential to keep fish hooks sharp, whether the fish hooks be part of a lure or are attached to a fishing line for use with bait mounted on the fish hooks.

Generally, fish hooks get dull after constant use, or from getting snagged on rocks or brush. Fish hooks may also get dull because they are kept in the tackle box with other paraphernalia.

When a fisherman is fishing or between seasons he often finds that he would like to sharpen a particular hook or lure. If he is using small hooks, it is difficult to hold the hook and to sharpen the hook with conventional fish hook sharpeners. In cold weather, and particularly when ice fishing, a fisherman often finds that it is difficult to hold a hook for the purpose of sharpening or tying a hook to his fishing line.

Generally, fishermen have quite a number of tools in a tackle box, and it is desirable to reduce the amount of paraphernalia by combining various functions of different tools into a single tool.

SUMMARY OF THE INVENTION

The present invention provides a fisherman's tool which is capable of easily gripping a fish hook while the fish hook is being sharpened or the line is being attached to it. The device generally includes a tube with a wedging member such as a tapered rod removably positioned in the tube to hold a fish hook within the tube. The rod holds the fish hook in the tube by wedging the fish hook into a secure engagement with the tube. An abrasive means, for example a stone or file, is mounted on a cap, which cap serves multiple purposes, that is, retaining the rod within the tube when the tool is being carried and also providing a holder for a formed abrasive means which is used to sharpen the fish hook. The fish hook may also be positioned in the tube, with the barb of the hook within the tube to present the eye of the hook so that the hook may be easily and conveniently tied to a line. The cap carries a blade which is used to cut the line. The tapered rod is utilized for holding the fish hook within the tube, and also is magnetized to prevent dropping hook after rod is removed and for picking up small objects from tackle box or boat. The rod also has one end formed into the blade of a screwdriver to provide a tool for tightening or loosening a screw in a reel or any similar device. It is a principal object of this invention to provide a fisherman's tool which may be conveniently carried as a single unit, but then may be separated to have one portion hold a fish hook and the other portion used to sharpen the point of the fish hook.

It is another object of the present invention to provide a fisherman's tool for holding a fish hook in an attitude to present the eye of the fish hook to receive readily a line.

It is a further object of the herein-disclosed invention to provide a fisherman's tool which includes an abrasive means for conveniently sharpening a fish hook.

It is another object of the present invention to provide a fisherman's tool for permitting a fish hook to be straightened.

It is still further object of the present invention to provide a fisherman's tool which includes a convenient line-cutting device.

Other objects and uses of this invention will become readily apparent to those skilled in the art upon a perusal of the following specification in light of the accompanying drawing.

BRIEF DESCRIPTION OF THE DRAWING

FIG. 1 is a side elevational view of a fisherman's tool embodying the herein-disclosed invention;

FIG. 2 is a side elevational exploded view of the fisherman's tool shown in FIG. 1, but showing the three main parts of the tool separated from each other;

FIG. 3 is a cross-sectional view of a portion of the fisherman's tool shown in FIG. 1, showing a fish hook positioned in a tube and held by a rod;

FIG. 4 is a cross-sectional view similar to FIG. 3, but showing the barb and point of a fish hook positioned within the tube and held in position by the rod;

FIG. 5 is a cross-sectional view taken on Line 5—5 of FIG. 1, showing the cross-section of the abrasive means mounted on a cap; and FIG. 6 is a side elevational view taken on line 6—6 of FIG. 2, showing the abrasive means.

DESCRIPTION OF THE PREFERRED EMBODIMENT

Referring now to the drawings, and especially to FIG. 1, a fisherman's tool embodying the instant invention is shown therein and is generally indicated by numeral 10. Looking now to FIG. 2, it may be seen that the fisherman's tool generally consists of a tube 12 having one end closed, a specially shaped tapered rod 14 which is positionable in the tube, and a cap 16 which is mountable on one end of the tube, which is open, to hold the rod 14 in the tube.

The tube 12 consists of a cylindrical body 18 having a hexagonal outer periphery. A bottom 20 is formed integral with the body to close one end of the body. A tapered head 22 is formed integral with the body adjacent to the open end of the tube and is adapted to receive the cap 16. A collar 24 is formed integral with the tapered head 22 and the body 18 to form a stop for the cap 16. In this instance, the tube 12 is made of a molded plastic; however, any other convenient material may be used.

The rod 14 generally consists of a solid cylindrical upper portion 26 and a specially shaped, tapered lower portion 28. A pair of ears 30 is formed integral with the upper portion 26. The lower portion 28 is tapered into a screwdriver blade 32. The rod 14 is made of a magnetized metal.

The cap 16 generally includes a cylindrical barrel body 34 which has one end closed and the other end open to receive the rod 14 and the tapered head 22 of the tube. Formed integral with the barrel body is a clip 36. The clip 36 includes a base 38 which is formed integral with the body 34 and an arm 40. Arm 40 has one end formed integral with the base 38 and the other end has a protuberance 42 formed thereon, engageable with the body 34.

As may be seen in FIGS. 1 and 2, the clip base 38 includes a recess 44. A blade 46 is mounted in the recess, with its cutting edge below the surface of the base. It is important to note that the blade 46 is recessed so that in order for the blade to cut, a part must be brought down into the recess 44 below the surface of the base to cut that part.

The barrel body 34 includes a platform 48 formed integral therewith. A sharpening abrasive means such as a stone or file 50 is fixed to the platform and protrudes from the barrel body to present a sharpening surface. The abrasive means 50 has a groove 52 in its center for receiving the point of a fish hook. The groove is parallel to the axis of the barrel body. As may be best seen in FIG. 5, one surface of the abrasive means 50 adjacent to the groove is a convex surface 54, and surface 56, on the other side of the groove, is flat. These surfaces provide an accommodation to receive different shaped hooks. The abrasive means 50 has a bottom 58 which is mounted in engagement with the stone platform 48. The abrasive means 50 also has a pair of beveled ends 60 and 62.

Referring now to FIG. 3, it may be seen how a conventional fish hook 64 is held in tool 10. A conventional fish hook generally includes a hook 66, with a point 68 formed integral with one end of the hook. A barb 70 is positioned adjacent to the point 68, and a shank 72 is formed integral with the other end of the hook. An eye 74 is formed on the free end of the shank.

The fish hook is held in the tool by placing the shank 72 and the eye 74 within tube 12 and then positioning the tapered lower portion 28 of the rod 14 into the tube. The tapered lower portion 28 engages the shank 72 and eye 74 of the fish hook to hold the fish hook in position with the point extending outward away from the tube. The abrasive means 50 is then used to sharpen the point. The point of the fish hook is placed into the groove 52 and the abrasive means is moved relative to the fish hook, thereby stroking the point and sharpening the point. It may be appreciated that even though the hook may be small, it will be securely and firmly held in the tube 12. It is important to note that the fish hook can be sharpened with the line still attached to the hook. In order to release the fish hook it is necessary only to withdraw the rod from the tube.

It is thus a primary purpose of the invention to provide a fish hook sharpener wherein a hook is inserted in a holding member and the hook is prevented from moving while it is being sharpened. Also a tapered magnetized rod provides the wedging action against the hook. Accordingly, when the rod is pulled out of its wedging position the magnetized rod will cause the hook to magnetically attach itself to the rod, thus preventing the hook from falling off. This is particularly important as the size of the hook being used decreases. It should be noted that the construction of each of the parts of the tool is such that none will readily roll away from a fisherman, even if the fisherman is in a boat and lays one of the parts of the tool on a seat or other portion of a boat.

The tool may also be used to hold the fish hook for securing a line to the fish hook. It may be appreciated that when a small hook is being used in cold weather, it is difficult for a fisherman to hold the hook. Thus, he need only place the point of the hook into the tube and place the rod into the tube, as shown in FIG. 4, thereby holding the hook securely. This presents the eye of the hook for ready insertion of the fish line. Once the line is secured to the hook, the fisherman may cut the line by placing the line into the recess 44 of the clip base for engagement with the blade 46.

Since hooks from time to time are bent or twisted because of coming in contact with foreign matters, the tool can be used to straighten the hook by inserting the hook into the tool with the barb part inward and bending or re-aligning the hook to its original shape with just the use of ones hands.

Inasmuch as the rod 14 is magnetized, it may be used to pick up small hooks out of a tackle box. Furthermore, the rod may also be used as a screwdriver for emergency repairs to a reel or other equipment.

Once the fisherman has completed use of the tool, he may readily reassemble the tool by placing the rod into the tube and placing the cap into engagement with the tapered head 22, thereby securely holding the rod in the tube. The fisherman may then place the tool in a pocket or other convenient place and the tool is held therein by the clip 36.

Although a specific embodiment of the instant invention has been shown and described in detail above, it is readily apparent that those skilled in the art may make various modifications and changes in the present invention without departing from the spirit and scope thereof. It is to be expressly understood that the specific disclosure set forth is solely for purposes of illustration in accordance with the applicable patent laws and is in no way deemed to limit the scope of the present invention. The instant invention is limited only by the appended claims.

What is claimed is:

1. A fish hook sharpener comprising, a tube, a tapered rod positionable in the tube and engageable with a fish hook having a portion in the tube for holding the fish hook in engagement with the tube, a cap removably mounted on the tube for removably holding the rod in the tube, an abrasive means mounted on the cap.

2. A fish hook sharpener as defined in claim 1 wherein the rod is magnetized whereby when the rod is withdrawn from the tube the hook remains magnetically attached thereto.

3. A fish hook sharpener as defined in claim 1 wherein the abrasive means has a groove for engagement with the point of the fish hook to sharpen the point.

4. A fish hook sharpener as defined in claim 2 wherein one surface of the abrasive means on one side of the groove is convex and another surface of the abrasive means on the other side of the groove is flat.

5. A fish hook sharpener as defined in claim 1 wherein the cap includes a recess having a blade mounted in the recess to provide a means for cutting a line.

* * * * *